(12) United States Patent
Yamada et al.

(10) Patent No.: US 7,802,915 B2
(45) Date of Patent: Sep. 28, 2010

(54) DEVICE AND METHOD FOR ADJUSTING THE DEGREE OF MIXING

(75) Inventors: Sayaka Yamada, Kobe (JP); Kazuo Yamaguchi, Takasago (JP); Yasuaki Yamane, Takasago (JP); Kazuhisa Fukutani, Kobe (JP)

(73) Assignee: Kobe Steel, Ltd., Kobe-shi (JP)

( * ) Notice: Subject to any disclaimer, the term of this patent is extended or adjusted under 35 U.S.C. 154(b) by 0 days.

(21) Appl. No.: 12/571,867

(22) Filed: Oct. 1, 2009

(65) Prior Publication Data

US 2010/0110822 A1    May 6, 2010

(30) Foreign Application Priority Data

Oct. 31, 2008    (JP) .............................. 2008-280640

(51) Int. Cl.
*B29B 7/48* (2006.01)
*B29C 47/74* (2006.01)

(52) U.S. Cl. .......................................... 366/80; 366/85

(58) Field of Classification Search ............. 366/79–80, 366/82–85, 88–90; 425/200–209
See application file for complete search history.

(56) References Cited

U.S. PATENT DOCUMENTS

| | | | | |
|---|---|---|---|---|
| 3,070,836 A | * | 1/1963 | De Haven et al. | 264/40.7 |
| 3,419,250 A | * | 12/1968 | Brennan, Jr. | 366/196 |
| 3,870,285 A | * | 3/1975 | Bausch et al. | 366/80 |
| 3,981,658 A | * | 9/1976 | Briggs | 425/205 |
| 4,007,545 A | * | 2/1977 | Briggs | 34/397 |
| 4,136,968 A | * | 1/1979 | Todd | 366/85 |
| 4,332,481 A | * | 6/1982 | Inoue et al. | 366/84 |
| 4,462,691 A | * | 7/1984 | Boguslawski | 366/80 |

(Continued)

FOREIGN PATENT DOCUMENTS

EP    1 902 824 A1    3/2008

(Continued)

*Primary Examiner*—Charles E Cooley
(74) *Attorney, Agent, or Firm*—Oblon, Spivak, McClelland, Maier & Neustadt, L.L.P.

(57) ABSTRACT

The device for adjusting the degree of mixing according to the present invention is installed in mixing equipment equipped with a kneading/mixing screw for mixing material while feeding the material to a downstream side, wherein a gate member is moved relative to a portion of a circular section provided for the kneading/mixing screw so as to cause a change in the area of a flow path formed between the gate member and the portion of a circular section, thereby adjusting the degree of mixing of the material. A drive quantity changing device; is disposed between the gate member and a drive member. The drive quantity changing device; is constructed so as to change the drive quantity, x, into the movement quantity, $\Delta\delta$, in accordance with a profile such that a change rate of the movement quantity, $\Delta\delta$, relative to the drive quantity, x, is made smaller when the degree of opening, $\delta$, of the gate member is smaller and the change rage of the movement quantity, $\Delta\delta$, relative to the drive quantity, x, is made larger when the degree of opening, $\delta$, of the gate member is larger. Through such construction, it is possible to let the degree of mixing change at a constant change rate relative to the drive quantity of the drive member.

9 Claims, 9 Drawing Sheets

U.S. PATENT DOCUMENTS

| | | | |
|---|---|---|---|
| 5,145,251 A * | 9/1992 | Shirato et al. | 366/80 |
| 5,335,991 A * | 8/1994 | Wobbe | 366/79 |
| 5,672,005 A * | 9/1997 | Fukui et al. | 366/75 |
| 6,238,079 B1 * | 5/2001 | Watada et al. | 366/80 |
| 6,607,299 B1 * | 8/2003 | Bacher et al. | 366/87 |
| 7,635,217 B2 * | 12/2009 | Rokey et al. | 366/80 |
| 7,677,787 B2 * | 3/2010 | Yamane et al. | 366/80 |
| 2007/0237022 A1 * | 10/2007 | Wiltz et al. | 366/80 |
| 2007/0237850 A1 * | 10/2007 | Wiltz et al. | 425/114 |
| 2010/0110822 A1 * | 5/2010 | Yamada et al. | 366/76.93 |

FOREIGN PATENT DOCUMENTS

| | | |
|---|---|---|
| JP | 02263609 A * | 10/1990 |
| JP | 04014412 A * | 1/1992 |
| JP | 04257414 A * | 9/1992 |
| JP | 10278099 A * | 10/1998 |
| JP | 10-305422 | 11/1998 |
| JP | 2000309017 A * | 11/2000 |
| JP | 2002028963 A * | 1/2002 |
| JP | 2003033961 A * | 2/2003 |
| JP | 3854298 | 9/2006 |

* cited by examiner

DEVICE AND METHOD FOR ADJUSTING THE DEGREE OF MIXING

BACKGROUND OF THE INVENTION

1. Field of the Invention

The present invention relates to a device and method for adjusting the degree of mixing in mixing equipment such as, for example, an extruder or a continuous mixer.

2. Description of the Related Art

Generally, a composite resin material, e.g., plastic compound, is produced by feeding pellets or powder of a polymer resin as a matrix, as well as an admixture, into a barrel of mixing equipment such as an extruder or a continuous mixer, and feeding the two to a downstream side while mixing the two with kneading/mixing screws inserted into the barrel. The longer the material is stayed, allowing mixing to proceed, in a mixing section within the barrel, the higher becomes the degree of mixing of material in the mixing equipment. Therefore, in the conventional extruder or continuous mixer, a mixing degree adjusting device equipped with a gate member for damming up material is provided downstream of a mixing section. The degree of material retention is changed by opening or closing the gate member, thereby changing a pressure difference $\Delta P$ across the gate member to adjust the degree of mixing.

As such mixing degree adjusting devices there are known, for example, those disclosed in Japanese Patent No. 3854298 and Japanese Patent Laid-Open Publication No. Hei 10 (1998)-305422. The mixing degree adjusting devices disclosed therein each have a portion of a circular section formed in a cylindrical shape at an intermediate position axially of each kneading/mixing screw. Further, through a barrel at an axial position corresponding to the portion of a circular section there is provided a gate member for changing the flow path area of material with respect to the portion of a circular section.

The gate member described in each of the above patent literatures can move toward and away from the portion of a circular section. When the gate member is moved toward the portion of a circular section, material stays in a mixing section and a pressure difference $\Delta P$ across the gate member becomes large, so that the degree of mixing becomes high. When the gate member is moved away from the portion of a circular section, the material becomes easier to flow and the pressure difference $\Delta P$ becomes small, so that the degree of mixing becomes low.

In the mixing degree adjusting devices disclosed in the foregoing patent literatures, the change in the pressure difference $\Delta P$ across the gate member is not linear relative to a drive quantity, x, of gate member drive means. In other words, the degree of mixing changes in a non-linear manner relative to the drive quantity, x, of the gate member drive means. For example, in the case where the degree of opening, $\delta$, of the gate member is small, even a slight movement of the gate member would lead to a sudden increase of flow path area, so that pressure difference $\Delta P$ (i.e., the degree of mixing) is suddenly changed. However, in case of the gate member opening, $\delta$, being large, even a slight movement of the gate member would not cause a great change in both flow path area and pressure difference $\Delta P$.

That is, the pressure difference $\Delta P$ shows a certain linear correlativity with respect to the flow path area of material, but is non-linear with respect to the degree of opening, $\delta$, of the gate member. As a matter of course, in the mixing degree adjusting device disclosed in each of the foregoing patent literatures in which the degree of opening, $\delta$, of the gate member, in other words, a movement quantity, $\Delta\delta$, of the gate member relative to the portion of a circular section, is changed at a certain change rate, the gate operability is poor when adjusting the flow path area at the beginning of opening of the gate member (e.g., in a range up to a degree of opening of 1 mm or so), and it is difficult to make a stable adjustment of the pressure difference, $\Delta P$, (i.e., the degree of mixing).

SUMMARY OF THE INVENTION

The present invention has been accomplished in view of the above-mentioned problems and it is an object of the invention to provide a mixing degree adjusting device and method capable of stably adjusting the pressure difference, $\Delta P$, (i.e., the degree of mixing) across a gate member at the beginning of opening of the gate member.

The present invention adopts the following technical means for achieving the above-mentioned object of the invention.

According to the present invention there is provided a device for adjusting the degree of mixing installed in mixing equipment equipped with a kneading/mixing screw for mixing material while feeding the material to a downstream side, the device comprising a gate member, the gate member being moved relative to a portion of a circular section provided in the kneading/mixing screw in such a manner that the area of a flow path formed between the gate member and the portion of a circular section changes to adjust the degree of mixing of the material, drive means for moving the gate member, and drive quantity changing means provided in the drive means, the drive quantity changing means being constructed so as to give a relation between a drive quantity, x, of the drive means and a movement quantity, $\Delta\delta$, of the gate member such that when a degree of opening, $\delta$, of the gate member is small, a change rate of the movement quantity, $\Delta\delta$, relative to the drive quantity, x, becomes smaller.

Preferably, the relation between the drive quantity, x, and the movement quantity, $\Delta\delta$, is set so that a pressure difference, $\Delta P$, across the gate member changes at a constant change rate relative to the drive quantity, x. Preferably, the relation in question is derived by applying the condition that the change rate of the pressure difference, $\Delta P$, across the gate member relative to the drive quantity, x, is constant to the relation between the movement quantity, $\Delta\delta$, of the gate member and the pressure difference, $\Delta P$, across the gate member.

In the case where the drive quantity changing means is a cam member disposed between the gate member and an actuator provided as the drive means, it is preferable that the cam member has such a profile as to make the change rate of the movement quantity, $\Delta\delta$, relative to the drive quantity, x, smaller when the degree of opening, $\delta$, of the gate member is smaller and make the change rate larger when the degree of opening, $\delta$, of the gate member is larger. In this case, it is preferable that the cam member includes a guide groove having the profile, and that when the cam member is operated by the drive means, the gate member moves while being guided by the guide groove, with a consequent change in the degree of opening, $\delta$, of the gate member.

The drive means may include a drive motor for controlling a gate position. The drive quantity changing means may include gate position detecting means for detecting the position of the gate member and control means which in accordance with a predetermined relation between the drive quantity, x, of the drive means and the movement quantity, $\Delta\delta$, of the gate member, controls a rotational quantity of the drive motor so that the drive quantity, x, corresponds to a detected value obtained by the gate position detecting means.

The drive quantity changing means may be a cam member including a guide groove having the foregoing profile, and construction may be made such that when the cam member is operated by the drive means, the gate member moves while being guided by the guide groove of the cam member, with a consequent change of its opening degree δ.

According to the present invention there also is provided a method for adjusting the degree of mixing used for a mixing degree adjusting device, the mixing degree adjusting device being installed in mixing equipment having a kneading/mixing screw for mixing material while feeding the material to a downstream side, the mixing degree adjusting device including a gate member, the gate member being moved relative to a portion of a circular section provided in the kneading/mixing screw so as to cause a change in the area of a flow path formed between the gate member and the portion of a circular section to adjust the mixing degree of the material, comprising: in accordance with a predetermined relation between a drive quantity, x, of drive means for moving the gate member and a movement quantity, Δδ, of the gate member, operating the gate member in such a manner that a change rate of the movement quantity, Δδ, relative to the drive quantity, x, is made smaller when a degree of opening, δ, of the gate member is smaller.

In the case where the relation between the drive quantity, x, and the movement quantity, Δδ, is set so that a pressure difference, ΔP, across the gate member changes at a constant change rate relative to the drive quantity, x, the gate member may be operated in accordance with the predetermined relation between the drive quantity, x, of the drive means and the movement quantity, Δδ, of the gate member.

The relation between the drive quantity, x, and the movement quantity, Δδ, can be derived by applying the condition that the change rate of the pressure difference, ΔP, across the gate member relative to the drive quantity, x, is constant, to the relation between the movement quantity, Δδ, of the gate member and the pressure difference, ΔP, across the gate member.

By the mixing degree adjusting device and method according to the present invention the pressure difference, ΔP, across the gate member, (i.e., the degree of mixing), can be adjusted stably at the beginning of opening of the gate member.

DETAILED DESCRIPTION OF THE PREFERRED EMBODIMENTS

First Embodiment

A first embodiment of the present invention will be described below with reference to the accompanying drawings.

As shown schematically in FIG. 1, a mixing degree adjusting device 1 according to a first embodiment of the present invention is installed in a same-direction rotating intermeshed twin-screw extruder 2 (hereinafter referred to simply as the extruder 2 as the case may be). The extruder 2 includes a barrel 3, the barrel 3 having a hollow interior, and a pair of kneading/mixing screws 4, 4 inserted axially into the hollow barrel 3. In the extruder 2, the kneading/mixing screws 4 rotate within the barrel 3 to feed material to a downstream side while mixing the material.

Figure 1:
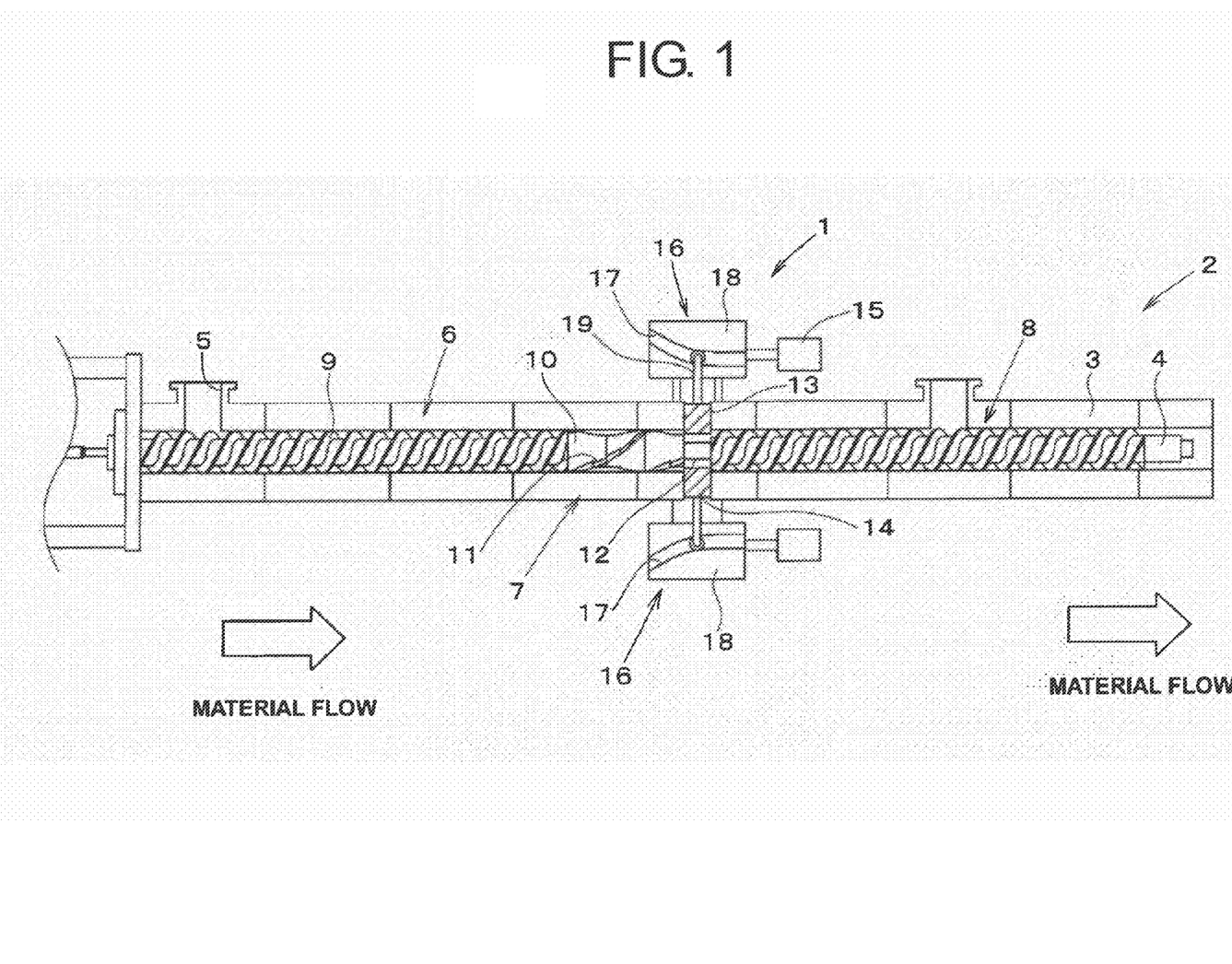
FIG. 1 is a sectional front view of an extruder equipped with a mixing degree adjusting device according to a first embodiment of the present invention.

In the following description it is assumed that the left side of the paper surface in FIG. 1 is an upstream side and the right side of the paper surface is a downstream side when explaining the extruder 2. The direction along a rotational axis of each kneading/mixing screw 4 is designated an axial direction when explaining the extruder 2, and the axial direction coincides with the right-and-left direction of the paper surface in FIG. 1. Further, an up-and-down direction of the paper surface in FIG. 1 is designated a vertical direction when explaining the extruder 2.

The barrel 3 is formed in a long tubular shape in the axial direction. A cavity is formed in the interior of the barrel 3. The cavity is in the shape of glasses which is long in the axial direction, and a pair of kneading/mixing screws 4, 4 is inserted into the cavity rotatably.

The barrel 3 is provided with a material supply port 5 on the upstream side in the axial direction. Material can be supplied into the cavity through the material supply port 5. In the barrel 3 there is provided a heating unit (not shown) using an electric heater or heated oil. With the heating unit, the material supplied from the material supply port 5 is heated to a melted or half-melted state.

The pair of right and left kneading/mixing screws 4 is provided through the cavity of the barrel 3. Each kneading/mixing screw 4 has an axially long spline shaft (not shown). Plural segment members are fixed in a skewered manner by the spline shaft.

Various types of segment members are available as the segment members which constitute each kneading/mixing screw 4. In each kneading/mixing screw 4, plural types of segment members are combined to form a feed section 6 for feeding the material, a mixing section 7 for mixing the material, and an extruding section 8 for feeding the mixed material to the downstream side, the feed section 6, mixing section 7 and extruding section 8 being formed over a predetermined range in the axial direction. Each of the kneading/mixing screws 4 used in this embodiment has one feed section 6, one mixing section 7 and one extruding section 8 in this order from the upstream side toward the downstream side.

The feed section 6 is composed of plural screw segments 9 disposed in the axial direction. With rotation of the screw segments 9 the material is fed from the upstream side to the downstream side.

The mixing section 7, in this embodiment, is composed of plural rotor segments 10 disposed in the axial direction. The rotor segments 10 are each provided with plural mixing flights 11 which are twisted spirally in the axial direction. In the rotor segments 10, the mixing flights 11 are rotated to pass the material through tip clearances formed between tip portions of the mixing flights 11 and an inner wall surface of the barrel 3, thereby shearing (mixing) the material. Although the mixing section 7 used in this embodiment is composed of only the rotor segments 10 each having a plus twist angle in the direction to feed the material to the downstream side, the mixing section 7 may be constituted by plural kneading disc segments or both rotor segment 10 and kneading disc segment.

The extruding section 8, like the feed section 6, is axially provided with plural screw segments 9 having spirally twisted screw flights. The screw segments 9 in the extruding section 8 are formed so that the more downstream the position of screw segment 9 is, the smaller the pitch. Thus, it is intended that the more downstream the material is positioned, the lower the moving speed of the material to permit the material to be so much pressurized.

The portion between the mixing section 7 and the extruding section 8 is formed in a stepped shape and the mixing degree adjusting device 1 is installed in this stepped portion. The mixing degree adjusting device 1 includes a portion 12 of a circular section provided in each kneading/mixing screw 4 and gate members 13 provided in the barrel 3 at a position corresponding axially to the circular-section portion 12. The gate members 13 can move toward and away from the circular-section portion 12, whereby the area of a flow path formed between each gate member 13 and the circular-section portion 12 is changed, thereby making it possible to adjust a pressure difference $\Delta P$ of material between the upstream side and the downstream side of the gate member 13, i.e., the degree of mixing of the material.

The mixing degree adjusting device 1 of this first embodiment will be described below.

Figure 2:
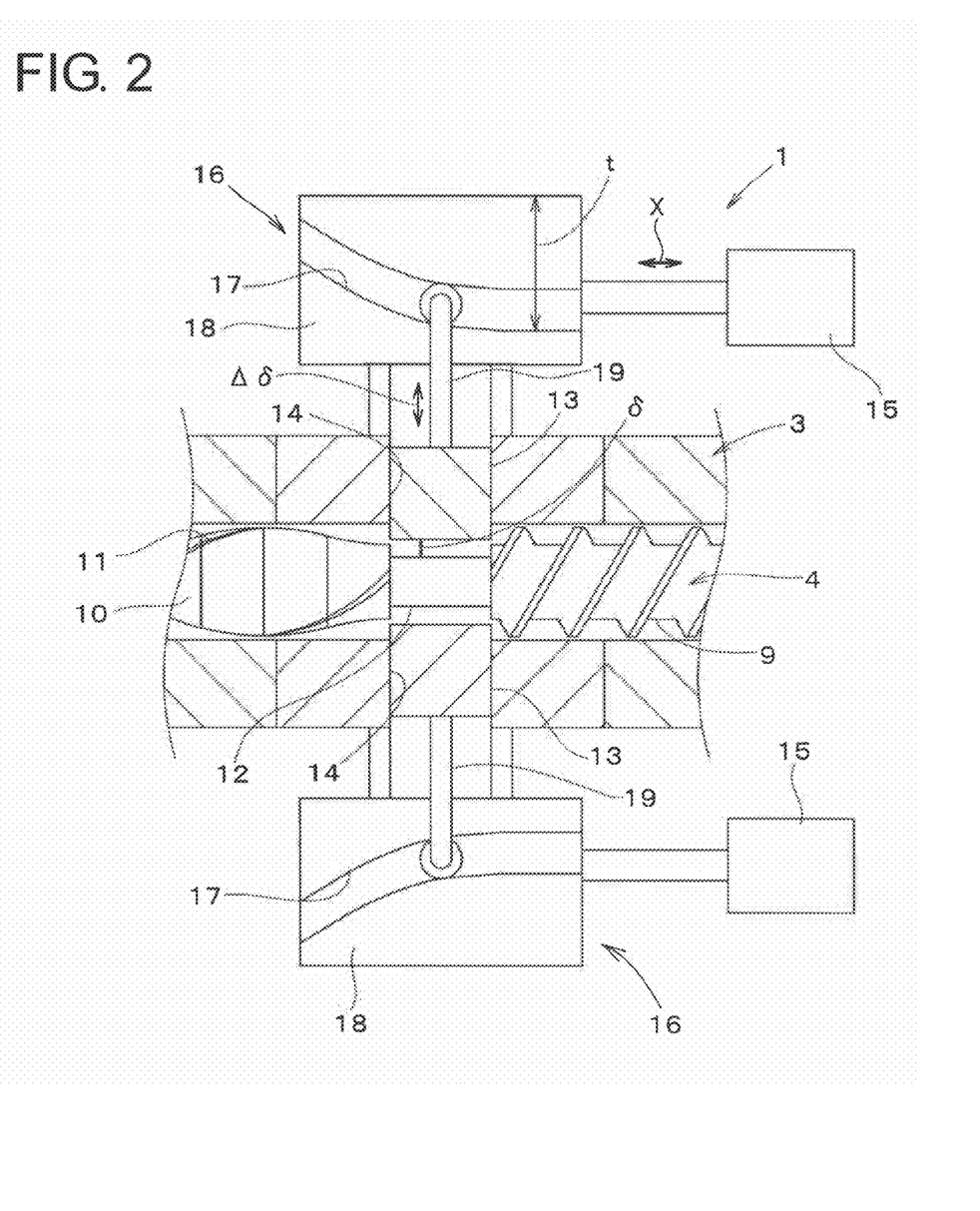
FIG. 2 is an enlarged sectional view of the mixing degree adjusting device of the first embodiment.

As shown in FIG. 2, the circular-section portion 12 in the intermeshed twin-screw extruder has a cylindrical shape coaxial with the associated kneading/mixing screw 4 and is formed smaller in diameter than the upstream-side rotor segment 10 and the downstream-side screw segment 9. As to an outer periphery surface of the circular-section portion 12, its section perpendicular to the axial direction is formed in a circular shape centered on the rotational axis of the kneading/mixing screw 4.

In each gate member 13, the portion corresponding to the circular-section portion 12 is cut out along the circular arc of the circular-section portion to form opposed edges. A pair of gate members 13 are provided so as to sandwich the circular-section portion 12 from above and below. The gate members 13 are inserted into guide holes 14 respectively which are formed through the barrel 3. The gate members 13 can advance and retreat along the guide holes 14. Drive means 15 are connected to the gate members 13 respectively. With the drive means 15, the upper and lower gate members 13 move at the same timing and in different upward and downward directions.

In the mixing degree adjusting device 1 of this first embodiment, as shown in FIG. 2, drive quantity changing means 16 is disposed between each gate member 13 and a linearly displacing actuator used as drive means 15. In accordance with a predetermined relation between a drive quantity, x, of the drive means 15 (actuator) and a movement quantity, $\Delta\delta$, of the gate member 13, the drive quantity changing means 16 changes the drive quantity, x, of the drive means 15 for the gate member 13 to the movement quantity, $\Delta\delta$, of the gate member 13.

The drive quantity changing means 16 used in this first embodiment specifically includes a cam member 18 having a guide groove 17 and also includes an operating member 19 for moving the gate member 13 while being guided by the guide groove 17 of the cam member 18.

The cam member 18 is disposed slidably in parallel with the axial direction and the drive means 15 is connected to one axial end of the cam member 18. The drive means 15 is constituted as a linear actuator. For example, by operating a built-in drive motor, the cam member 18 can be slid a predetermined distance in the axial direction.

The guide groove 17 formed in the cam member 18 is inclined so as to change gradually in a non-linear manner relative to the sliding direction. An end portion of the operating member 19 located on the side opposite to the associated kneading/mixing screw 4 is movably engaged in the guide groove 17. An end portion of the operating member 19 located on the screw 4 side is fixed to the gate member 13. Accordingly, when the cam member 18 is slid in one axial direction with use of the drive motor, the guide groove 17 slides in the same direction to match the sliding motion of the cam member 18, so that both axial and vertical positions of the guide groove with the operating member 19 engaged therein change, and the gate member 13 moves in either upward or downward direction in accordance with the change in the engaged position of the operating member 19.

The guide groove 17 is formed along a predetermined profile so that upon sliding of the cam member 18 the gate member 13 connected to the operating member 19 moves while a change is made to a predetermined movement quantity, $\Delta\delta$, in accordance with the profile. The profile is set such that the change rate of the movement quantity, $\Delta\delta$, relative to the drive quantity, x, is made small when the degree of opening, $\delta$, of the gate member 13 is small, while it is made large when the degree of opening, $\delta$, of the gate member 13 is large. Thus, when the degree of opening, $\delta$, of the gate member 13 is small, the change rate of the movement quantity, $\Delta\delta$, relative to the drive quantity, x, is small and the change in the movement quantity, $\Delta\delta$, becomes gentle, so that it becomes possible to stably adjust the pressure difference, $\Delta P$, across the gate member, (i.e., the degree of mixing).

In this profile, the relation between the drive quantity, x, and the movement quantity, $\Delta\delta$, is set in such a manner that the pressure difference, $\Delta P$ across the gate member changes at a constant change rate relative to the drive quantity, x. In a computer aided simulation, the relation can be derived by applying the condition that the change rate of the pressure difference, $\Delta P$, across the gate member relative to the drive quantity, x, is constant to the relation between the movement quantity, $\Delta\delta$, of the gate member 13 and the pressure difference, $\Delta P$, across the gate member.

By forming the guide groove 17 along such a profile it becomes possible to once change the drive quantity, x, of the drive means 15 to the movement quantity, $\Delta\delta$, of the gate member 13 which exhibits a constant change rate relative to the pressure difference, $\Delta P$, across the gate member and then possible to let the pressure difference $\Delta P$ across the gate member change at a constant change rate with use of the movement quantity, $\Delta\delta$.

More specifically, the aforesaid profile can be obtained in the following manner.

Figure 3:
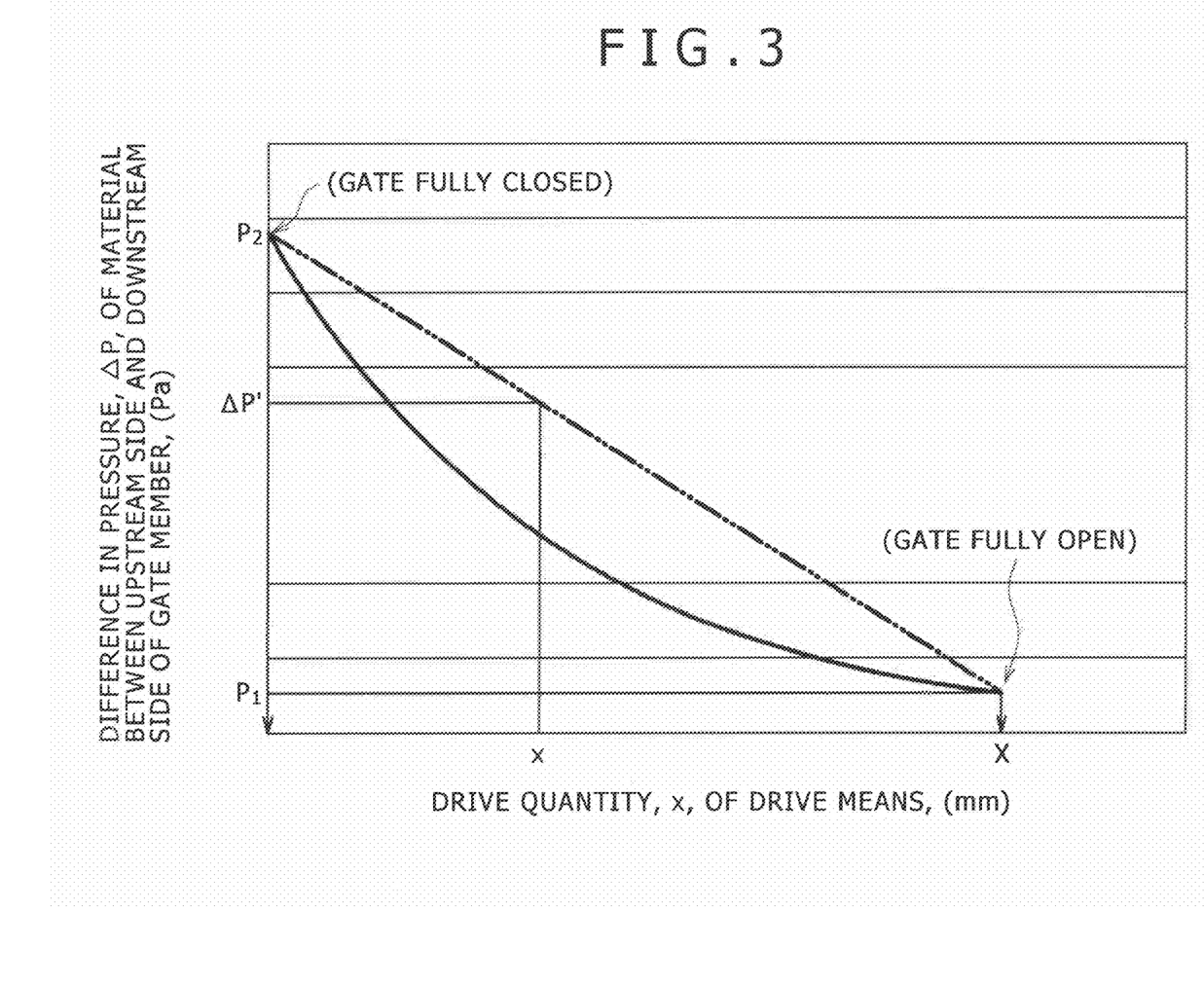
FIG. 3 is an explanatory diagram showing a change in pressure difference relative to the degree of opening of a gate member in the first embodiment.

As shown in FIG. 3, when on the basis of the material pressure near the front of the gate member and that near the rear of the gate member, the pressure difference between the material pressure, $\Delta P$, on the upstream side of the gate member and that on the downstream side of the gate member is plotted relative to the degree of opening, $\delta$, of the gate member 13, this pressure difference, ΔP, represents a non-linear relation relative to the degree of opening, δ, of the gate member 13. It is known from the past results that the relation of the pressure difference, ΔP, relative to the degree of opening, δ, of the gate member 13 is an exponential function, which is like the following equation (1):

$$\Delta P = ae^{b\delta} \qquad (1)$$

δ: the degree of opening of the gate member, (mm)
a, b: constant

However, in the mixing degree adjusting device according to the present invention it is intended that the pressure difference, ΔP, changes at a constant change rate relative to the degree of opening, δ, of the gate member 13, so such a rectilinear relation as indicated by a dash-double dot line in FIG. 3 relative to the movement quantity, x, of the gate member 13 outputted from the drive quantity changing means 16 must be established with respect to a pressure difference, ΔP'. Assuming that the pressure difference, ΔP' is equal to $P_1$ when the gate is fully open (movement quantity, X), the dash-double dot line relation is, for example, like the following equation (2):

$$\Delta P' = c_1 x + c_2 \qquad (2)$$
$$c_1 = \frac{P_2 - P_1}{X}$$
$$c_2 = P_2$$

x: drive quantity of the drive means, (mm)
$P_1$: upstream-downstream pressure difference of the gate member in a fully open condition of the gate member
$P_2$: upstream-downstream pressure difference of the gate member in a fully closed condition of the gate member
X: movement quantity from fully closed to fully open of the gate member If ΔP is set equal to ΔP' in the equations (1) and (2) for deriving the relation between the drive quantity, x, and the movement quantity, Δδ, there is obtained the following relation (3):

$$\delta = \frac{\ln(c_1 x + c_2) - \ln a}{b} \qquad (3)$$

Next, consideration will now be given about the guide groove 17 of the cam member 18 whose profile is formed so as to satisfy the relation of the equation (3). As shown in FIG. 2, if the vertical distance from an end edge of the cam member 18 located on a remote side from the kneading/mixing screw 4 up to the guide groove 17 is assumed to be t, this distance, t, is equal to the movement quantity, Δδ, of the gate member 13, in other words, a vertically moved distance of the gate member 13 from the inner wall of the barrel 3, so the total sum of the distance, t, and the degree of opening, δ, of the gate member 13 becomes constant as in the following equation (4):

$$t + \delta = C_3 \qquad (4)$$

$C_3$: constant

If the degree of opening, δ, of the gate member 13 obtained in the equation (3) is substituted into the equation (4) and the equations are arranged in order, the result is like the following equation (5):

$$t = C_3 - \frac{\ln(c_1 x + c_2) - \ln a}{b} \qquad (5)$$

Figure 4:
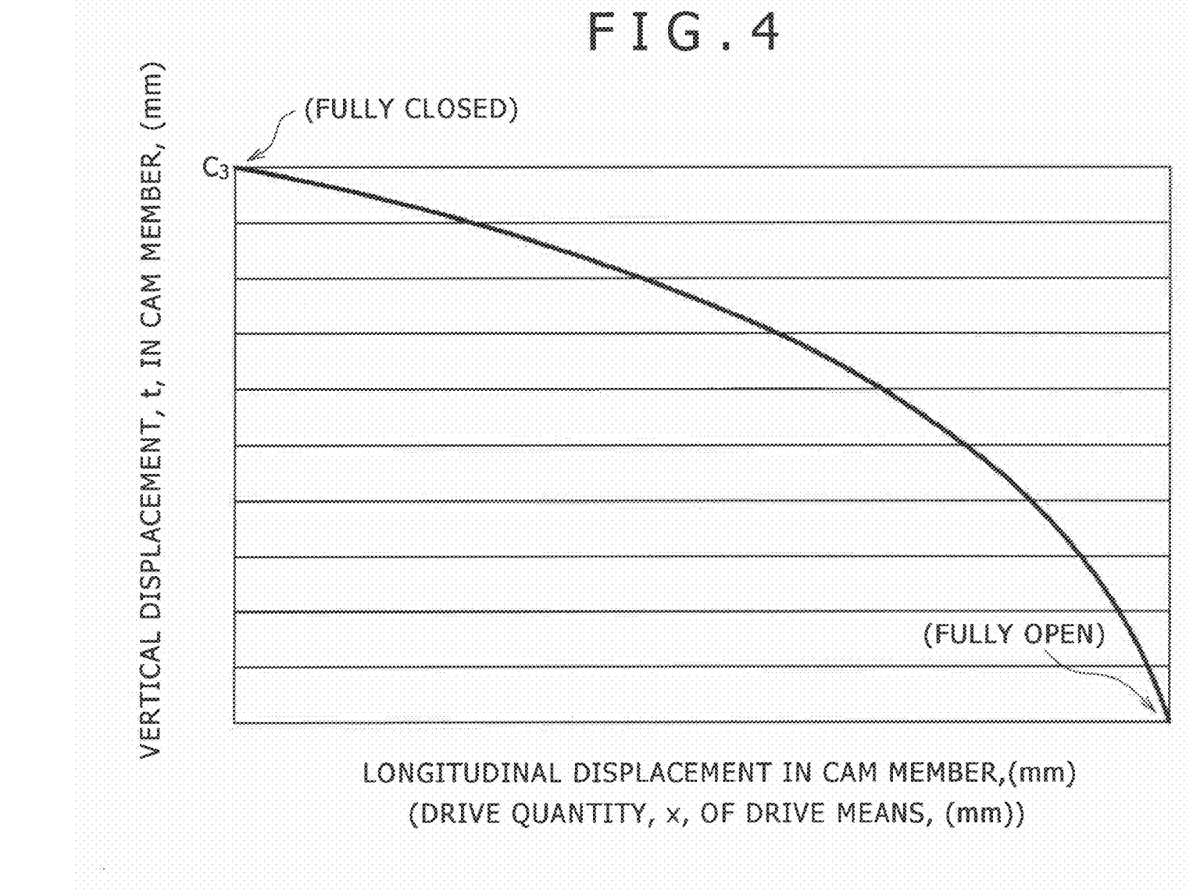
FIG. 4 is a diagram showing a profile of the first embodiment.

As shown in FIG. 4, the guide groove 17 represented by the equation (5) is formed at a small inclination angle relative to the axial direction when the drive quantity, x, of the drive means 15 is small. In other words, when the degree of opening, δ, of the gate member 13 is small, the change rate of the movement quantity, Δδ, relative to the drive quantity, x, is small and it is possible to make a fine adjustment of the pressure difference, ΔP, (i.e., the degree of mixing).

Moreover, as shown in FIG. 4, when the drive quantity, x, of the drive means 15 is large, the guide groove 17 is formed at a large inclination angle relative to the axial direction. In other words, when the degree of opening, δ, of the gate member 13 is large, the change rate of the movement quantity, Δδ, relative to the drive quantity, x, is large and thus, even at the same drive quantity, x, the pressure difference, ΔP, (i.e., the degree of mixing), can be changed more largely than in the conventional counterpart.

Figure 5:
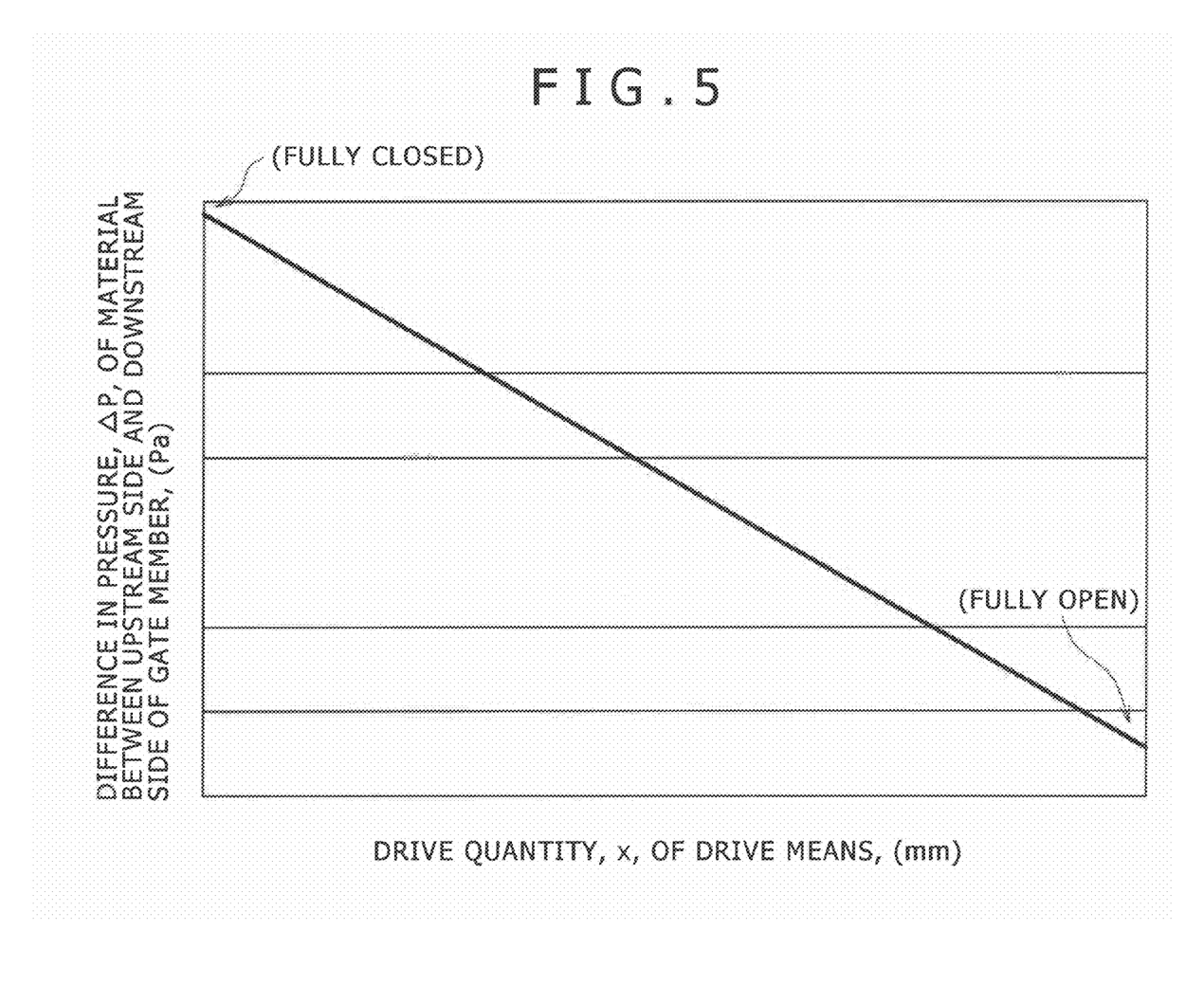
FIG. 5 is a diagram showing a change in pressure difference relative to a drive quantity in the first embodiment.

Therefore, if the pressure difference, ΔP, is adjusted using the gate member 13 having the guide groove 17 of this profile, the upstream-downstream pressure difference, ΔP, of the gate member 13, (i.e., the degree of mixing), does not change steeply relative to the drive quantity, x, of the drive means 15 even when the degree of opening, δ, is small as shown in FIG. 5, so that the degree of mixing can be adjusted highly accurately (stably). Besides, the pressure difference, ΔP, comes to change at a constant change rate relative to the drive quantity, x, and the controllability of the gate member 13 is improved.

Second Embodiment

Figure 6:
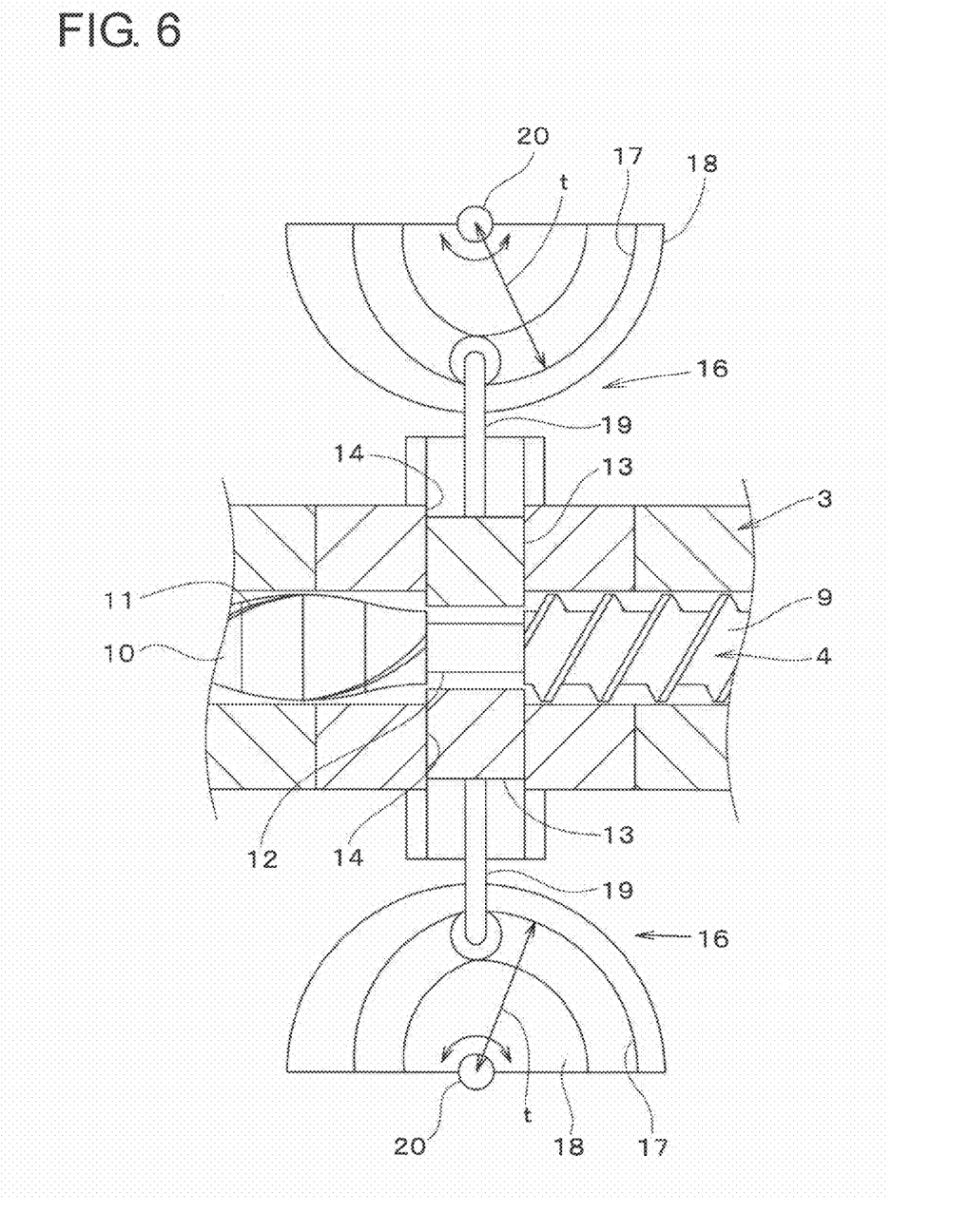
FIG. 6 is an enlarged sectional view of a mixing degree adjusting device according to a second embodiment of the present invention.

FIG. 6 illustrates a mixing degree adjusting device 1 according to a second embodiment of the present invention. The mixing degree adjusting device 1 of this second embodiment is different from that of the first embodiment in that cam members 18 are each mounted rotatably about a rotating shaft which is perpendicular to both axial and vertical directions and that the cam members 18 are each rotated about a rotating axis 20 by drive means 15 using a stepping motor or a servo motor.

More specifically, the cam members 18 used in this second embodiment are each formed with a spiral guide groove 17 centered on the rotating axis 20 and extending in the circumferential direction away from the rotating axis 20. When the cam member 18 is rotated in either normal or reverse direction, the position of the guide groove 17 with the operating member 19 engaged therein changes radially with respect to the rotating axis 20 and the gate member 13 moves either upward or downward.

A profile in the second embodiment is determined in the following manner.

The profile in question has a locus which moves spirally on coordinates with the rotating axis 20 as an origin. The locus of this profile is represented like the following equation (6), when a rotational angle (drive quantity) of the cam member 18 is x (rad):

$$x = t \times \cos\left(\frac{2\pi x}{360}\right) \qquad (6)$$

-continued $$y = t \times \sin\left(\frac{2\pi x}{360}\right)$$

Figure 7:
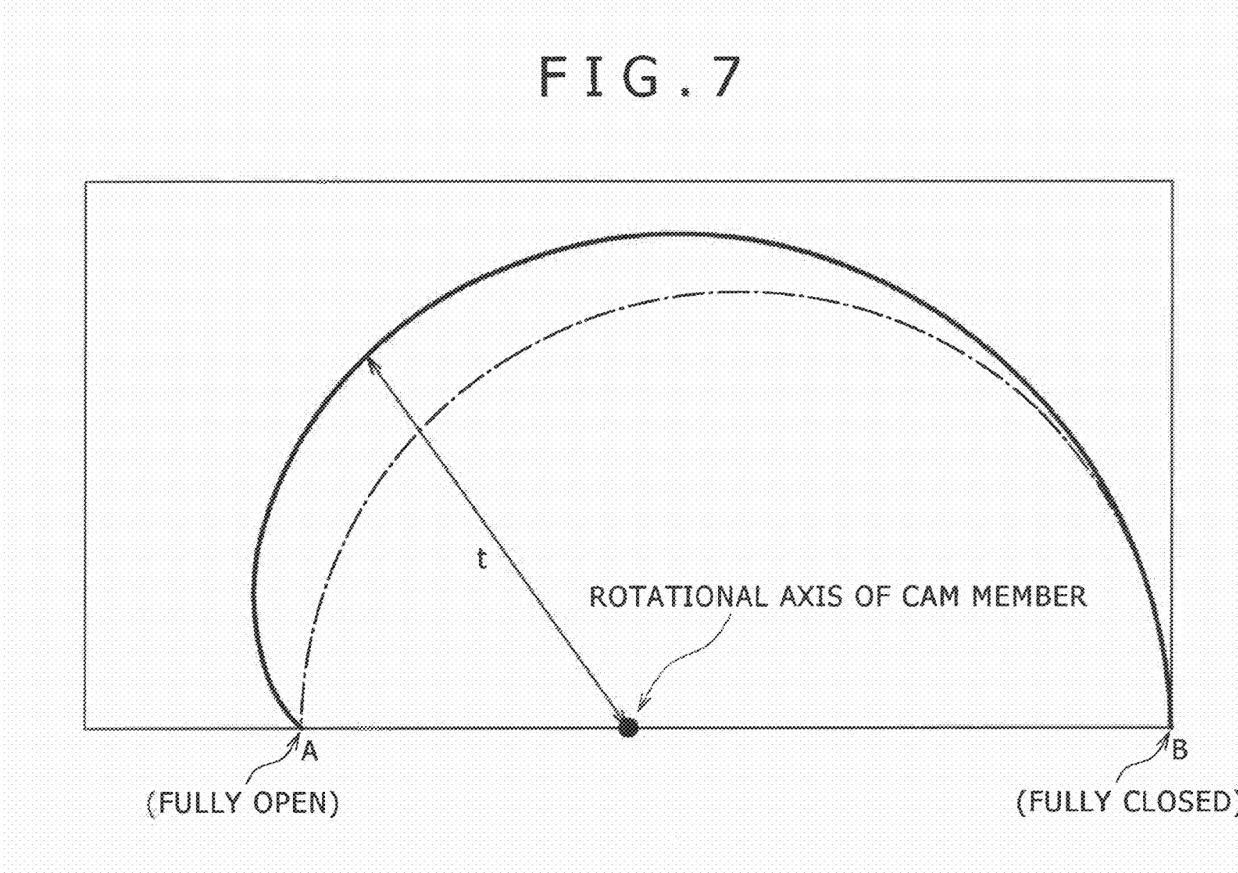
FIG. 7 is a diagram showing a profile of a second embodiment of the present invention.

By substituting a distance, t, derived from the equation (5) into the equation (6) there is obtained a locus of such a profile as shown in FIG. 7. In the locus of this profile, at one end (point A in FIG. 7) of the guide groove 17, the position of the guide groove 17 is close to the rotating axis 20 of the cam member 18, while at an opposite end (point B in FIG. 7) of the guide groove 17, the position of the guide groove 17 is distant from the rotating axis 20.

In the case where the position of the guide groove 17 changes linearly relative to the rotational angle, x, of the cam member 18, the guide groove 17 passes along the locus indicated by a dot-dash line in FIG. 7.

In this embodiment, however, the guide groove 17 is formed so as to be at a small angle in a tangential direction as compared with the locus indicated by the dot-dash line in FIG. 7 when the degree of opening, δ, of the gate member 13 is small (when located on the side close to point B in FIG. 7), and thus the change rate of the movement quantity, Δδ, relative to the drive quantity, x, is small. Further, the guide groove 17 is formed so as to be at a large angle in a tangential direction as compared with the locus indicated by the dot-dash line in FIG. 7 when the degree of opening, δ, of the gate member 13 is large (when located on the side close to point A in FIG. 7), and thus the change rate of the movement quantity, Δδ, relative to the drive quantity, x, is large.

Accordingly, in the mixing degree adjusting device 1 of this second embodiment, the pressure difference, ΔP, can be changed in a gentle manner when the degree of opening, δ, of the gate member 13 is small, so that even when the degree of opening, δ, is small, the degree of mixing can be adjusted highly accurately (stably). Further, since the pressure difference, ΔP, changes constantly even when the degree of opening, δ, of the gate member 13 is large, the pressure difference, ΔP, can be adjusted at a constant change rate relative to the drive quantity, x, and thus the controllability of the gate member 13 is improved.

Other constructional points than the above in the mixing degree adjusting device 1 of this second embodiment are the same as in the first embodiment and therefore explanations thereof will here be omitted.

Third Embodiment

Figure 8:
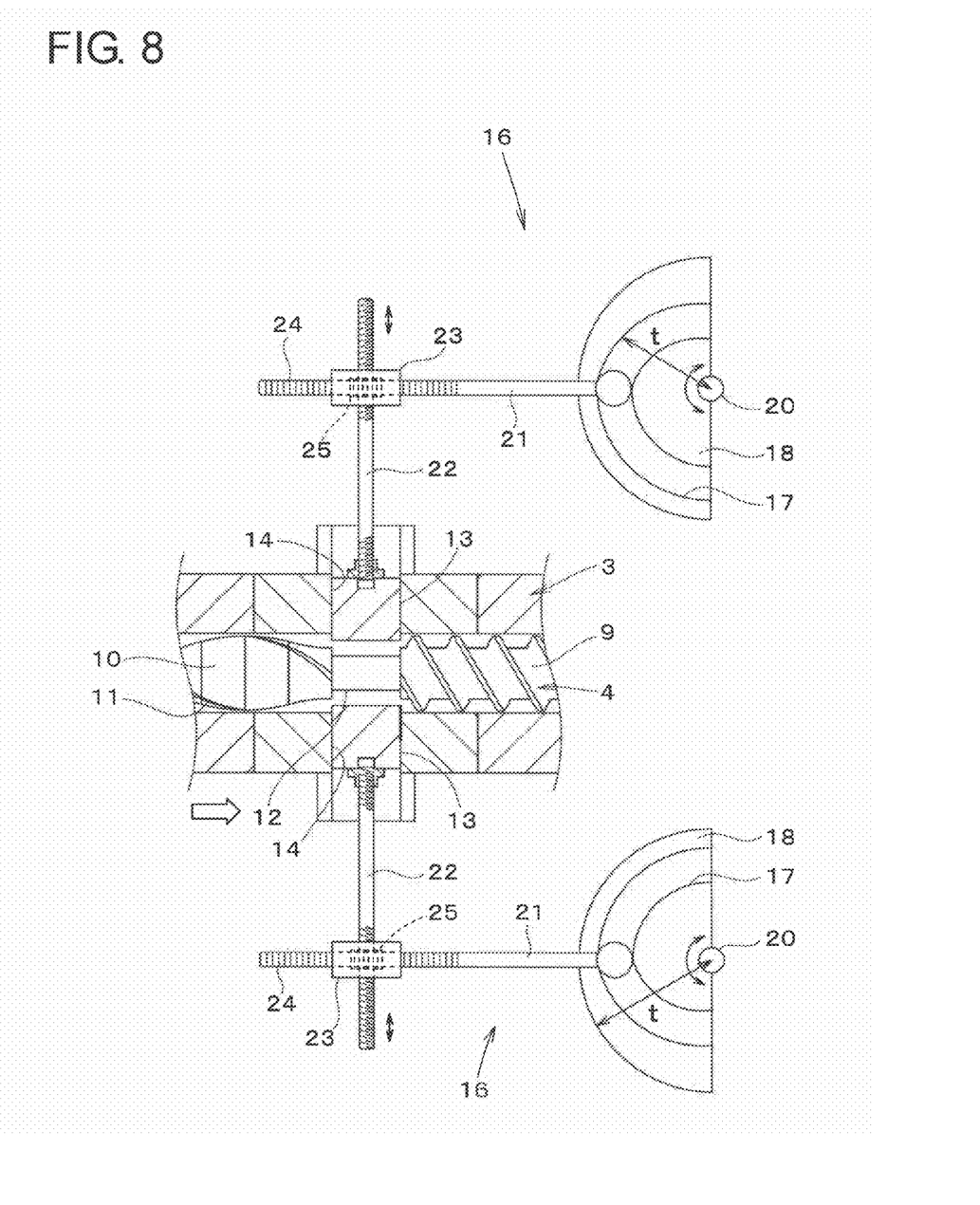
FIG. 8 is an enlarged sectional view of a mixing degree adjusting device according to a third embodiment of the present invention.

FIG. 8 illustrates a mixing degree adjusting device 1 according to a third embodiment of the present invention. The mixing degree adjusting device 1 of this third embodiment is different from that of the second embodiment in that drive quantity changing means 16 which utilizes a rack and pinion mechanism and a screw is disposed between each cam member 18 and the associated gate member 13. The drive quantity changing means 16 includes a first operating member 21 connected to the cam member 18, a second operating member 22 fixed to the gate member 13, and a motion converting section 23 for converting a rectilinear motion of the first operating member 21 into a vertical motion of the second operating member 22.

A rack portion 24 is formed on a free end side of the first operating member 21 and a pinion gear 25 meshing with the rack portion 24 is disposed rotatably in the interior of the motion converting section 23. A screw portion is formed on a free end side of the second operating member 22 and meshes with an internally threaded portion formed on an inner periphery side of the pinion gear 25. Therefore, when the first operating member 21 is slid in one axial direction, the pinion gear 25 installed in the motion converting section 23 rotates and the second operating member 22 meshing with the pinion gear 25 moves either upward or downward.

Other constructional points than the above, as well as function and effect, in the mixing degree adjusting device 1 of this third embodiment are the same as in the second embodiment and therefore explanations thereof will here be omitted.

Fourth Embodiment

Figure 9A:
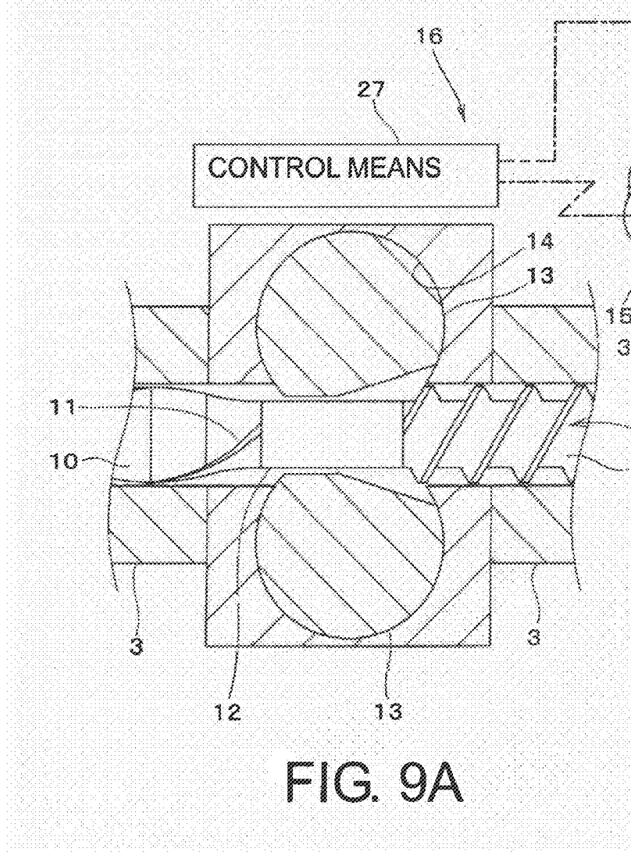
FIG. 9 is an explanatory diagram of a mixing degree adjusting device of a fourth embodiment of the present invention.
Figure 9B:
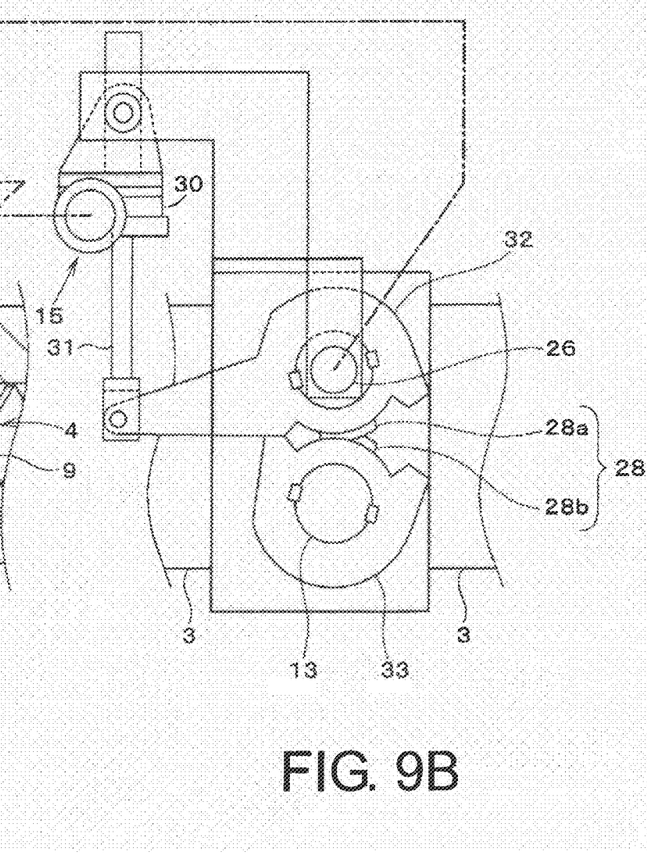

FIG. 9 illustrates a mixing degree adjusting device 1 according to a fourth embodiment of the present invention, in which FIG. 9A is a sectional view illustrating the mixing degree adjusting device 1 and FIG. 9B is an explanatory diagram of drive quantity changing means 16. The mixing degree adjusting device 1 of this fourth embodiment is different from that of the first embodiment in that the mixing degree adjusting device of this fourth embodiment is of a known gate bar type and is provided with bar-like gate members 13. More specifically, the gate members 13 used in this fourth embodiment are each formed in the shape of a round bar and are inserted rotatably into upper and lower guide holes 14 respectively which are formed in a direction crossing the kneading/mixing screws 4. A part of an outer periphery surface of each gate member 13 facing the circular-section portion 12 in a fully open condition of the gate member is cut out arcuately to match the inner periphery surface of the barrel 3 and another part thereof facing the circular-section portion 12 in a fully closed condition of the gate member 13 is cut out arcuately so as to extend along the outer periphery of the circular-section portion 12. Further, the mixing degree adjusting device 1 of this fourth embodiment is provided with a gate position controlling drive motor 15 as drive means for rotating each gate member 13 by a desired rotational quantity. The mixing degree adjusting device 1 transmits a driving force generated in the drive motor 15 to the gate members 13 via known power transfer means, causing the gate members 13 to rotate within the guide holes 14, thereby making it possible to change the material flow path area between the circular-section portion 12 and each gate member 13.

The known power transfer means performs the transfer of driving force so that gate rods rotate in accordance with rotation of the drive motor 15. For example, construction may be made such that the driving force generated in the drive motor 15 is transmitted to gate rods connected to drive plates 32 and 33 via a screw connection between a worm/worm wheel mechanism 30 and a rod 31, a link connection between the rod 31 and the first drive plate 32, and gears 28a and 28b which are provided on the first and second drive plates 32, 33, respectively, so as to mesh each other. This drive means is provided with drive quantity changing means 16 which changes the drive quantity, x, of the drive means 15 into the movement quantity, Δδ, of each gate member 13 in accordance with a predetermined relation between the drive quantity, x, of the drive means 15 and the movement quantity, Δδ, of the gate member 13.

The drive quantity changing means 16 includes gate position detecting means 26 for detecting the position of the gate member 13 and control means 27 which, in accordance with the predetermined relation between the drive quantity, x, of the drive means and the movement quantity, Δδ, of the gate member 13, controls the rotational quantity of the drive motor 15 so as to give a drive quantity, x, corresponding to a detected value from the gate position detecting means 26.

As the gate position detecting means 26 there is used a rotary encoder which can detect a rotational position of the gate member 13, in other words, a rotational angle of the gate member 13 relative to the barrel 3. The rotary encoder is provided for the rotational axis of the gate member 13 in the present embodiment. The value (rotational angle of the gate member 13) detected by the gate position detecting means 26 is outputted to the control means 27.

A predetermined relation between the drive quantity, x, of the drive means and the movement quantity, $\Delta\delta$, of the gate member 13, in other words, rotational quantities of the drive motor 15 corresponding to detected values provided from the gate position detecting means 26, is inputted (programmed) beforehand to the control means 27. That is, for the control means 27 there beforehand is determined a relation such that when the degree of opening, $\delta$, of the gate member 13, (a rotational angle, $\delta$, from the fully closed position of the gate bar), is small, the change rate of the movement quantity (rotational quantity, $\Delta\delta$) of the gate member 13 relative to the drive quantity, x, of the drive motor 15 is set small, while when the degree of opening, $\delta$, of the gate member 13 is large, the change rate of the movement quantity of the gate member relative to the drive quantity, x, is set large. The control means 27 calculates a rotational quantity (drive quantity, x) of the drive motor 15 corresponding to the detected value inputted to thereto and outputs it to the drive motor 15. In this embodiment, moreover, the rotational quantity of the drive motor 15 is controlled by the control means 27, thereby the pressure difference, $\Delta P$, can be changed at a constant change rate relative to the drive quantity, x.

The present invention is not limited to the above embodiments, but the shapes, structures, materials and combinations of the constituent members may be changed as necessary within the scope not altering the essence of the invention.

In the mixing degree adjusting devices 1 of the above embodiments the degree of mixing is adjusted by advance and retreat of the gate members 13 from the guide holes 14 of the barrel 3. For example, however, a modification may be made such that bar-like gate members (gate bars) are rotated within the guide holes 14 to change the area of the material flow path, thereby adjusting the degree of mixing.

In the third embodiment described above, motion converting sections 23 are provided in the mixing degree adjusting device 1 with rotating cam members 18. However, a modification may be made such that cam members 18 move in a rectilinear manner in the mixing degree adjusting device 1 and that motion converting sections 23 are installed in the device 1.

Although in the above embodiments the same-direction rotating intermeshed twin-screw extruder 2 is illustrated as the mixing equipment, the mixing degree adjusting device 1 may be installed also in an oppositely rotating type extruder 2 or may be installed in a continuous mixer. The number of kneading/mixing screws 4 used in the mixing equipment is not limited to two, but may be one for example.

What is claimed is:

1. A device for adjusting the degree of mixing installed in mixing equipment equipped with a kneading/mixing screw for mixing material while feeding the material to a downstream side, the device comprising:
   a gate member, said gate member being moved relative to a portion of a circular section provided in the kneading/mixing screw in such a manner that the area of a flow path formed between said gate member and the portion of a circular section changes to adjust the degree of mixing of the material;
   drive means for moving said gate member; and
   drive quantity changing means provided in said drive means,
   said drive quantity changing means being constructed so as to give a relation between a drive quantity, x, of said drive means and a movement quantity, $\Delta\delta$, of said gate member such that when a degree of opening, $\delta$, of said gate member is small, a change rate of the movement quantity, $\Delta\delta$, relative to the drive quantity, x, becomes smaller.

2. The device for adjusting the degree of mixing according to claim 1, wherein the relation between the drive quantity, x, and the movement quantity, $\Delta\delta$, is set so that a pressure difference, $\Delta P$, across said gate member changes at a constant change rate relative to the drive quantity, x.

3. The device for adjusting the degree of mixing according to claim 2, wherein the relation between the drive quantity, x, and the movement quantity, $\Delta\delta$, is derived by applying the condition that the change rate of the pressure difference, $\Delta P$, across said gate member relative to the drive quantity, x, is constant to the relation between the movement quantity, $\Delta\delta$, of said gate member and the pressure difference, $\Delta P$, across said gate member.

4. The device for adjusting the degree of mixing according to claim 1, wherein said drive quantity changing means is a cam member disposed between said gate member and an actuator provided as said drive means, said cam member having such a profile as to make the change rate of the movement quantity, $\Delta\delta$, relative to the drive quantity, x, smaller when the degree of opening, $\delta$, of said gate member is smaller.

5. The device for adjusting the degree of mixing according to claim 4, wherein said cam member includes a guide groove having said profile, and when said cam member is operated by said drive means, said gate member moves while being guided by said guide groove, with a consequent change in the degree of opening, $\delta$, of said gate member.

6. The device for adjusting the degree of mixing according to claim 1, wherein said drive means includes a drive motor for controlling the position of said gate member, and said drive quantity changing means includes gate position detecting means for detecting the position of said gate member and control means which, in accordance with a predetermined relation between the drive quantity, x, of said drive means and the movement quantity, $\Delta\delta$, of said gate member, controls a rotational quantity of said drive motor so that the drive quantity, x, corresponds to a detected value obtained by said gate position detecting means.

7. A method for adjusting the degree of mixing used for a mixing degree adjusting device, the mixing degree adjusting device being installed in mixing equipment having a kneading/mixing screw for mixing material while feeding the material to a downstream side, the mixing degree adjusting device including a gate member, the gate member being moved relative to a portion of a circular section provided in the kneading/mixing screw so as to cause a change in the area of a flow path formed between the gate member and the portion of a circular section to adjust the mixing degree of the material, comprising:
   in accordance with a predetermined relation between a drive quantity, x, of drive means for moving the gate member and a movement quantity, $\Delta\delta$, of the gate member, operating the gate member in such a manner that a change rate of the movement quantity, $\Delta\delta$, relative to the drive quantity, x, is made smaller when a degree of opening, $\delta$, of the gate member is smaller.

8. The method for adjusting the degree of mixing according to claim 7, wherein the relation between the drive quantity, x, and the movement quantity, $\Delta\delta$, is set so that a pressure difference, $\Delta P$, across the gate member changes at a constant change rate relative to the drive quantity, x, and the gate member is operated in accordance with the predetermined relation between the drive quantity, x, of the drive means and the movement quantity, $\Delta\delta$, of the gate member.

9. The method for adjusting the degree of mixing according to claim 7, wherein the relation between the drive quantity, x, and the movement quantity, $\Delta\delta$, is derived by applying the condition that a change rate of a pressure difference, $\Delta P$, across the gate member relative to the drive quantity, x, is constant, to the relation between the movement quantity, $\Delta\delta$, of the gate member and the pressure difference, $\Delta P$, across the gate member, and the gate member is operated in accordance with the predetermined relation between the drive quantity, x, of the drive means and the movement quantity, $\Delta\delta$, of the gate member.

* * * * *